US012566336B1

(12) United States Patent
Jolly

(10) Patent No.: US 12,566,336 B1
(45) Date of Patent: Mar. 3, 2026

(54) ACOUSTICALLY FORMED DIFFRACTIVE OPTICAL ELEMENTS

(71) Applicant: Meta Platforms Technologies, LLC, Menlo Park, CA (US)

(72) Inventor: Sundeep Kumar Jolly, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 603 days.

(21) Appl. No.: 18/077,977

(22) Filed: Dec. 8, 2022

Related U.S. Application Data

(60) Provisional application No. 63/404,961, filed on Sep. 9, 2022.

(51) Int. Cl.
G02B 27/09 (2006.01)
G02B 27/01 (2006.01)
(52) U.S. Cl.
CPC .. G02B 27/0944 (2013.01); G02B 2027/0196 (2013.01)

(58) Field of Classification Search
CPC .................... G02B 27/0944; G02B 2027/0196
See application file for complete search history.

(56) References Cited

U.S. PATENT DOCUMENTS

2012/0274948 A1* 11/2012 Burkland ........... G01D 5/34715
356/616

OTHER PUBLICATIONS

Machine Translation CN 107645921 A (Year: 2018).*

* cited by examiner

*Primary Examiner* — Lucy P Chien
(74) *Attorney, Agent, or Firm* — Greenberg Traurig, LLP

(57) ABSTRACT
A diffractive optical element may include a slab of transparent photoelastic material and a set of acoustic transducers spread over the perimeter of the slab. The acoustic transducers generate surface and/or volume acoustic waves that induce a diffractive pattern in the slab due to photoelasticity. The diffractive patterns a dynamic, i.e. they may be changed by changing phases and frequencies of oscillation of the acoustic transducers. Focusing and redirection patterns may be used to refocus and/or redirect image light in a near-eye display.

20 Claims, 8 Drawing Sheets

ACOUSTICALLY FORMED DIFFRACTIVE OPTICAL ELEMENTS

REFERENCE TO RELATED APPLICATION

This application claims priority to U.S. Provisional Patent Application No. 63/404,961 filed on Sep. 9, 2022, entitled "Acoustically Formed Diffractive Optical Elements" and incorporated herein by reference in its entirety.

TECHNICAL FIELD

The present disclosure relates to optical devices, and in particular dynamic diffractive optical elements suitable for use in visual displays.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems, such s near-eye displays or NEDs, are intended for individual users.

An artificial reality system generally includes an NED, for example a headset or a pair of glasses or goggles, configured to present content to a user. The NED may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. To reduce size and weight and improve optical performance, head-mounted display devices require versatile and efficient image forming optical train including thin, stackable, and dynamically adjustable optical elements.

BRIEF DESCRIPTION OF THE DRAWINGS

Exemplary embodiments will now be described in conjunction with the drawings, in which.

DETAILED DESCRIPTION

Figure 1:
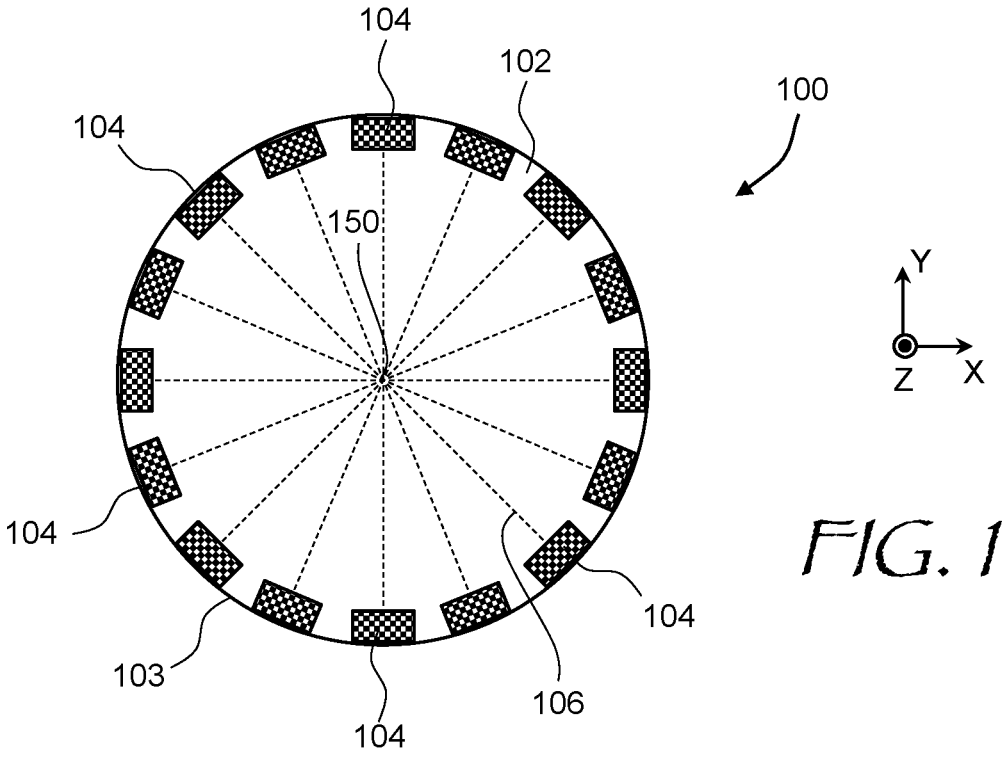
FIG. 1 is a schematic plan view of a surface acoustic wave dynamic diffractive optical element of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2 3A, 3B, 4A, 4B, 5A, 5B, 6A, and 6B, similar reference numerals denote similar elements.

A thin and light near-eye display, preferably in a form of eyeglasses, may use thin and lightweight varifocal lenses and tunable gratings. One approach to providing such elements is to form them acoustically. An acoustic wave includes regions of low and high pressure that translate into regions of low and high refractive index due to phenomenon of photoelasticity. A tunable acoustic optical element may include a slab of transparent material and a set of acoustic transducers on its perimeter that form an acoustic wave pattern in the slab that translates into a required refractive index variation. Examples of such devices are provided further below.

In accordance with the present disclosure, there is provided a diffractive optical element for at least one of redirecting or refocusing a light beam. The diffractive optical element comprises a slab of transparent material having opposed first and second surfaces for receiving the light beam at the first surface, propagating the light beam unidirectionally from the first surface to the second surface, and outputting the light beam at the second surface, and a set of acoustic transducers supported by the slab along its perimeter and configured to produce acoustic waves propagating in the slab towards its center. In operation, a distribution of refractive index variation caused by the acoustic waves causes diffraction of the light beam.

The slab may include a piezoelectric material. The perimeter of the slab may be e.g. rectangular or circular. The diffractive optical element may be configured to operate as a diffraction grating with variable angular dispersion, and/or as a varifocal diffractive lens.

The set of acoustic transducers may include a set of pairs of the acoustic transducers, such that the acoustic transducers of each pair are facing each other. The acoustic transducers of each pair may be configured to provide a standing acoustic wave. The set of acoustic transducers may include interdigitated electrodes on at least one of the first or second slab surfaces.

In accordance with the present disclosure, there is provided a near-eye display (NED) comprising a display panel for providing an image in linear domain, an ocular lens downstream of the display panel for converting the image in linear domain into an image in angular domain for observation by a user's eye, the image in angular domain being carried by image light, and a diffractive optical element of this disclosure. The NED may further include an eye tracking system for determining at least one of position or orientation of the user's eye at an eyebox of the NED, and a controller operably coupled to the eye tracking system and the diffractive optical element for causing the diffractive optical element to at least one of redirect or refocus the image light, based on the at least one of position or orientation of the user's eye determined by the eye tracking system.

In accordance with the present disclosure, there is further provided an NED comprising an image projector for providing a light beam carrying an image in angular domain, a pupil-replicating lightguide optically coupled to the image projector and configured to expand the light beam over an eyebox of the NED, and a diffractive optical element of this disclosure. The NED may further include an eye tracking system for determining at least one of position or orientation of the user's eye at an eyebox of the NED, and a controller operably coupled to the eye tracking system and the diffractive optical element for causing the diffractive optical element to at least one of redirect or refocus the image light, based on the at least one of position or orientation of the user's eye determined by the eye tracking system.

Referring now to FIG. 1, a diffractive optical element 100 includes a slab 102 of a transparent material such as glass, plastic, or an inorganic crystal, in this case of a circular shape, and a set of acoustic transducers 104 disposed along a perimeter 103 of the slab 102. In the example shown, the acoustic transducers 104 are evenly distributed along the perimeter 103. The slab 102 has front and rear surfaces. A thickness of the slab 102 is the distance from the front to the rear surface. The perimeter 103 defines the outer boundary of the circular slab 102. Each acoustic transducer 104 is coupled to a top (front) surface of the slab 102 inside the perimeter 103. The acoustic transducers 104 may also be coupled to the bottom (rear) surface of the slab 102. For piezoelectric slabs 102, each acoustic transducer 104 may include a set of interdigitated electrodes coupled directly to the top surface of the slab 102, for creating surface acoustic waves on the top surface of the slab 102. The surface acoustic waves may be obtained by applying an AC electric signal to the interdigitated electrodes to cause the top surface to oscillate. In some instances, volume acoustic waves may also be created using this method. For non-piezoelectric slabs 102, each acoustic transducer 104 may include a layer of a piezoelectric material coupled to a pair of electrodes The set of acoustic transducers 104 may be broken in pairs of the acoustic transducers 104 disposed opposite each other on the perimeter 103 and facing each other, as indicated with dashed lines 106. A line coupled the pairs of the acoustic transducers 104A may extend through a center 150 of the slab 102. In operation, the pairs of the acoustic transducers 104 may generate standing acoustic waves along the respective dashed lines 106. In operation, a light beam may impinge onto a top surface of the diffractive optical element 100, i.e. perpendicularly to the plane of FIG. 1. The acoustic waves may propagate in a direction substantially perpendicular to the light beam direction of propagation. The distribution of refractive index variation caused by acoustic waves causes the light beam to focus and/or deviate due to diffraction on periodic refractive index variations caused by the acoustic waves. The spatial distribution of the refractive index variations may be controlled by selecting frequencies and relative phases of modulation by the acoustic transducers 104.

Figure 2:
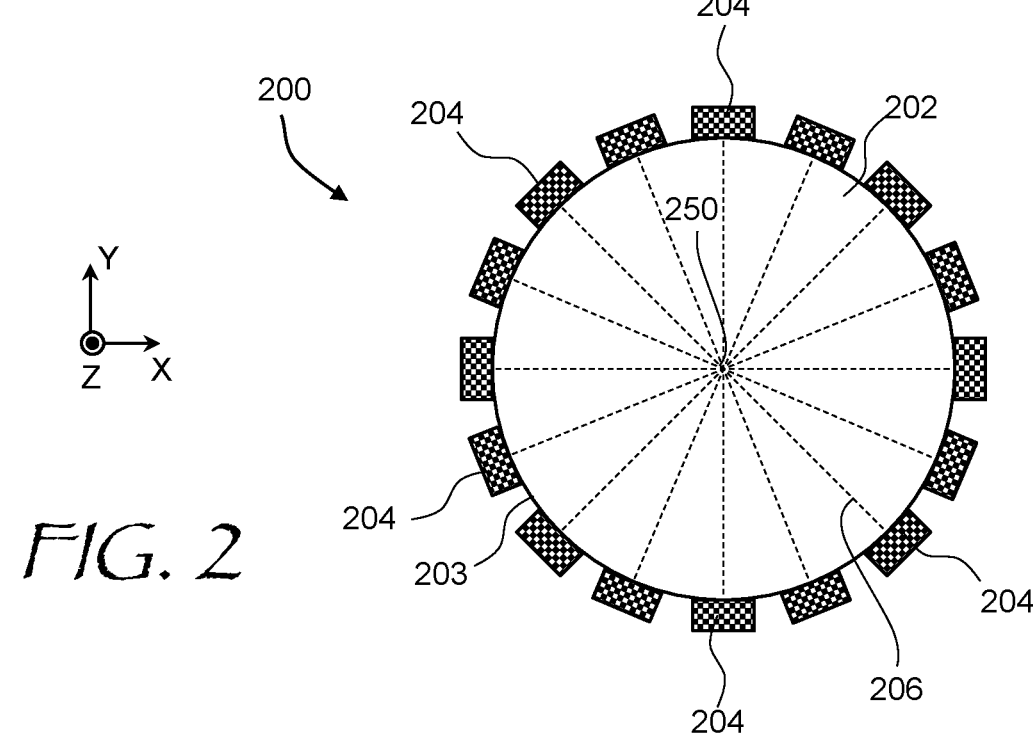
FIG. 2 is a schematic plan view of a volume acoustic wave dynamic diffractive optical element of this disclosure.

Referring to FIG. 2, a diffractive optical element 200 includes a slab 202 of transparent material of a circular shape, and a set of acoustic transducers 204 disposed along a perimeter 203 of the slab 202. In the example of FIG. 2, the acoustic transducers 204 are evenly distributed along the perimeter 203. The perimeter 203 defines a round side surface of the slab 202, which is an outer boundary of the slab 202 extending between its front and rear surfaces along a thickness dimension of the slab 102. In the embodiment of FIG. 2, each acoustic transducer 104B is coupled to the outer boundary of the slab 202 for generating volume acoustic waves in the slab 202.

The slab 202 may include glass, plastic, an inorganic crystal, or another transparent photoelastic material. A photoelastic material is a material whose refractive index depends on amount of mechanical stress applied to the material. In operation, the acoustic transducers 204 generate acoustic waves which induce local mechanical stress variation patterns, which, due to the photoelasticity of the material of the slab 202, are translated into local refractive index variations. The impinging light diffracts on these local refractive index variations, changing its divergence and/or direction of propagation.

The set of acoustic transducers 204 may include a set of pairs of the acoustic transducers 204 disposed opposite each other on the perimeter 203 and facing each other, as indicated with dashed lines 206. A line coupled the pairs of the acoustic transducers 204 may extend through a center 250 of the slab 202. The pairs of the acoustic transducers 204 may generate a standing volume acoustic wave within the slab 202 along the dashed lines 206. In operation, a light beam may impinge onto the top surface of the diffractive optical element 200, i.e. perpendicular to the plane of FIG. 2, and perpendicular to the plane of propagation of the volume acoustic waves. The distribution of refractive index variation caused by the volume acoustic waves causes the light beam to focus and/or deviate.

Figure 3A:
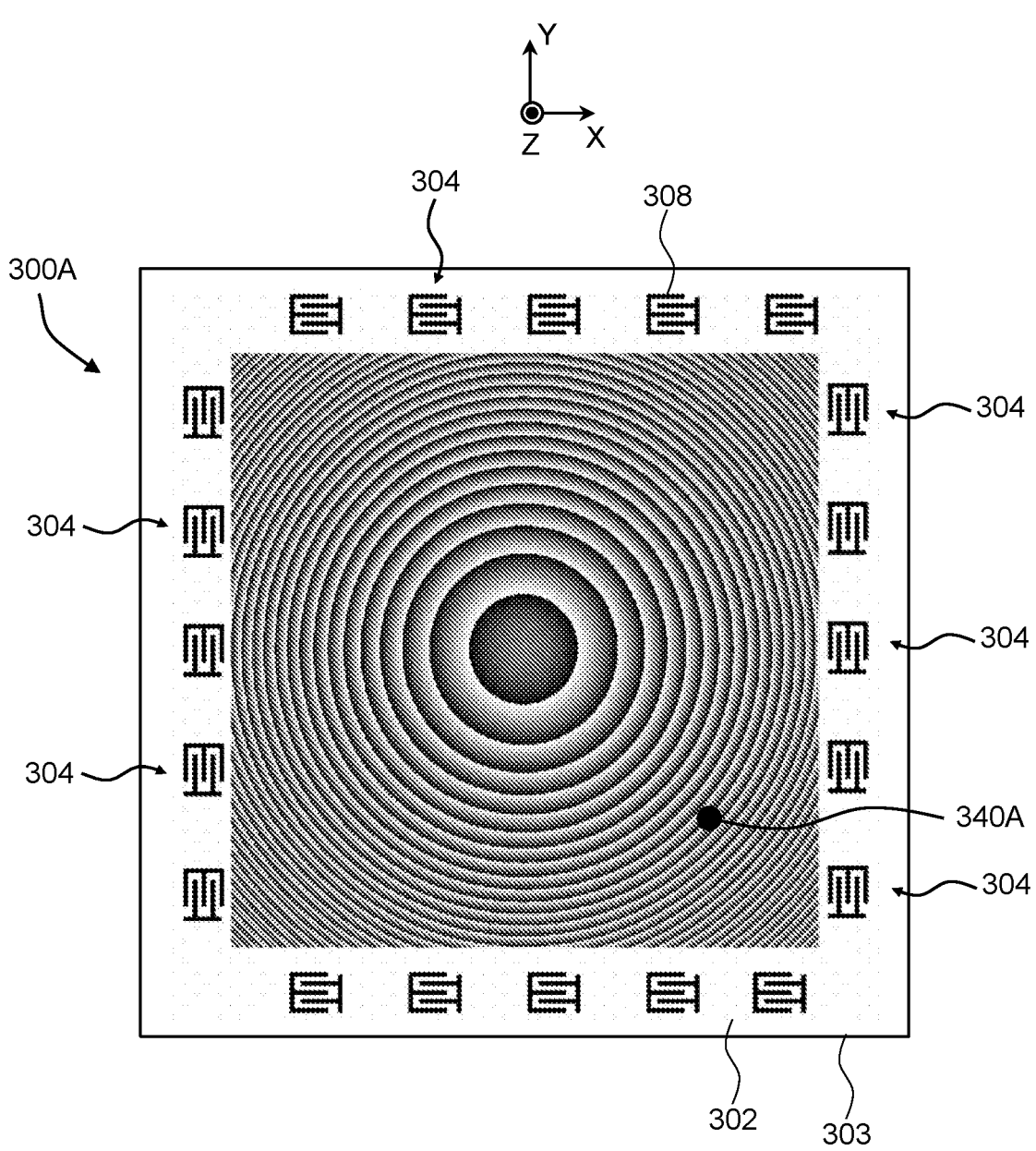
FIG. 3A is a schematic plan view of an acoustically induced varifocal lens.

Referring now to FIG. 3A, a diffractive optical element 300A is similar to the diffractive optical element 100 of FIG. 1, and includes similar components. The diffractive optical element 300A of FIG. 3A includes a slab 302 of a transparent piezoelectric material, in this example of a rectangular shape, and a set of acoustic transducers 304 disposed along a perimeter 303 of the slab 302, parallel to the side walls of the slab 302. Each acoustic transducer 304 is coupled to a top and/or bottom surface of the slab 302 along the perimeter 303. Each acoustic transducer 304 may include a set of interdigitated electrodes 308 coupled to the slab 302 surface, for creating surface acoustic waves and, in some instances, volume acoustic waves.

The acoustic waves generated by individual transducers 304 may interfere to form various shapes and distributions of an acoustic wave amplitude. The specific shape may depend on frequencies and phases of oscillations that individual transducers 304 impart to the surface of the slab 302.

For example, FIG. 3A shows a converging circularly symmetrical acoustic wave 340A that may be obtained by providing corresponding phase delays to the driving AC signals of the individual transducers 304. The acoustic waves translate into a pressure waves which, due to photoelasticity of the slab 302, result in a circularly symmetrical refractive index distribution, causing the diffractive optical element 300A to operate as a dynamic/varifocal diffractive lens. The set of acoustic transducers 304 may include a set of pairs of the acoustic transducers 304 disposed opposite each other on the perimeter 303 and facing each other. The pairs of the acoustic transducers 304 generate a standing acoustic wave. In some embodiments, the acoustic transducers 304 may be coupled to a side wall of the slab 302, similarly to FIG. 2.

Figure 3B:
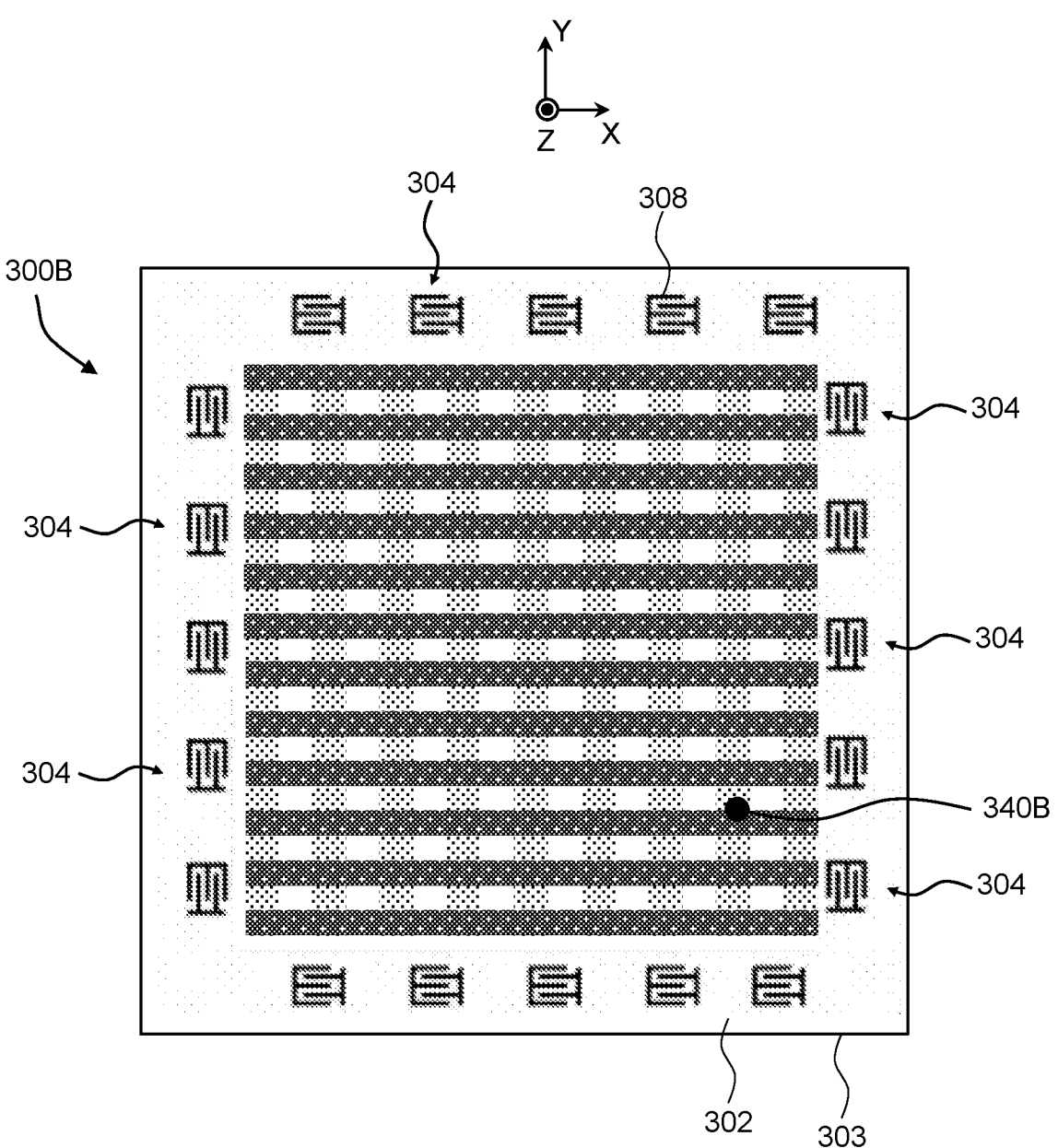
FIG. 3B is a schematic plan view of an acoustically induced dynamic diffraction grating.

Turning to FIG. 3B, a diffractive optical element 300B is a variant of the diffractive optical element 300A of FIG. 3A. The diffractive optical element 300B is configured to operate as a two-dimensional diffraction grating with variable X/Y grating pitch and, accordingly, variable angular dispersion in XZ and/or YZ planes. The acoustic transducers 304 disposed along each straight side of the perimeter 303 may be operated in-phase, i.e. with a zero phase delay, to provide a planar wave. Together, the planar waves form a rectangular pattern of acoustic waves 340B. The acoustic waves translate into a pressure waves which, due to photoelasticity of the slab 302, result in a 2D grating of local refractive index variations, forming a 2D diffraction grating with dynamically adjustable X/Y pitch of the grating.

In some embodiments, the acoustic transducers 304 may be broken into pairs of the acoustic transducers 304 disposed opposite each other on the perimeter 303 and facing each other. The pairs of the acoustic transducers 304 may generate a standing acoustic wave extending horizontally and vertically in FIG. 3B. The diffractive optical element 300B may be used as a dynamic 2D diffraction grating having a variable angular dispersion for redirecting and/or dispersing a light beam impinging normally to the plane of FIG. 3B into individual wavelength components. In some embodiments, the acoustic transducers 304 may be coupled to a side wall of the slab 302, similarly to FIG. 2.

Figure 4A:
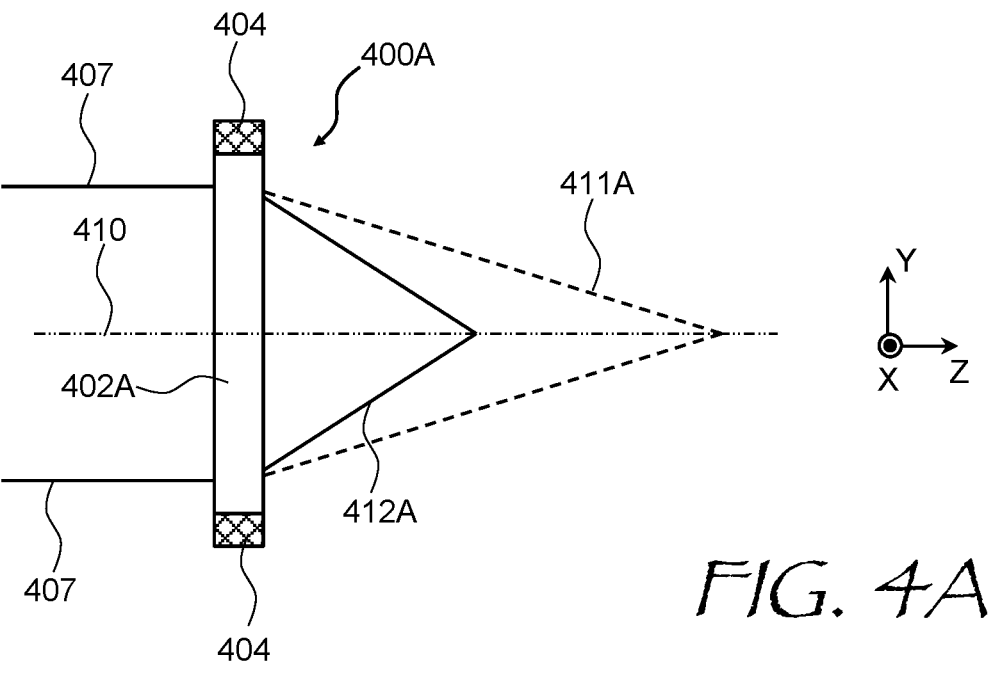
FIG. 4A is a schematic side view of a varifocal lens of this disclosure.

Referring to FIG. 4A, a diffractive optical element 400A is an embodiment of the diffractive optical element 100 of FIG. 1, the diffractive optical element 200 of FIG. 2, and the diffractive optical element 300A of FIG. 3A, and includes similar components. In the illustrated embodiment, the diffractive optical element 400A comprises a slab 402A of a transparent photoelastic material and a plurality of acoustic transducers 404 distributed along a perimeter of a clear aperture of the slab 402A. The diffractive optical element 400A of FIG. 4A is configured to variably focus a light beam 407 impinging onto the diffractive optical element 400A and propagating unidirectionally, i.e. from the upstream surface to the opposed downstream surface and through the diffractive optical element 400A. In varifocal lens embodiments, the slab 402A may, but does not have to, have a circular shape.

When the acoustic transducers 404A are driven at a first frequency, producing acoustic waves at a first frequency and a first pitch (i.e. spatial period of the acoustic waves), periodic local refractive index variations are induced due to photoelasticity of the slab 402A. The periodic local refractive index variations also have the first pitch. The light beam 407 would diffract on the periodic local refractive index variations caused by the acoustic waves, resulting in focusing of the light beam 407, as indicated with dashed lines 411A.

When the acoustic transducers 404 are driven at a second, higher frequency producing acoustic waves of a higher frequency and consequently smaller pitch of the acoustic waves, the light beam 407 focuses closer to the slab 402A. The light beam 407 exiting the diffractive optical element 400A is shown with solid lines 412A. Thus, focusing the light beam 407 at a different distances from the diffractive optical element 400A may be achieved by changing the driving frequency of the acoustic transducers 404A. Changing the driving frequency changes a period of a concentric diffraction pattern (i.e. concentric acoustic waves similar to those shown in FIG. 3A), and hence changes the focal length of the diffractive optical element 400A. Therefore, the diffractive optical element 400A may operate as a varifocal lens. The optical element 400A may further include lens element(s) with a constant optical power, e.g. refractive and/or reflective elements, to provide focusing or defocusing power to the optical element 400A when the acoustic transducers 404 are not energized.

The period of the diffraction pattern is changed by changing the time period of the acoustic wave modulation. In the embodiment of FIG. 4A, the light beam 407 impinges onto the slab 402A at a normal angle of incidence. Accordingly, both light beams exiting the diffractive optical element 400A remain on-axis, i.e. focus on an optical axis 410. In some embodiments, the light beam 407 may impinge non-normally, resulting in an off-axis focusing. In some embodiments, some of the acoustic transducers 404A may be in an OFF state, while the other ones are in an ON state.

Figure 4B:
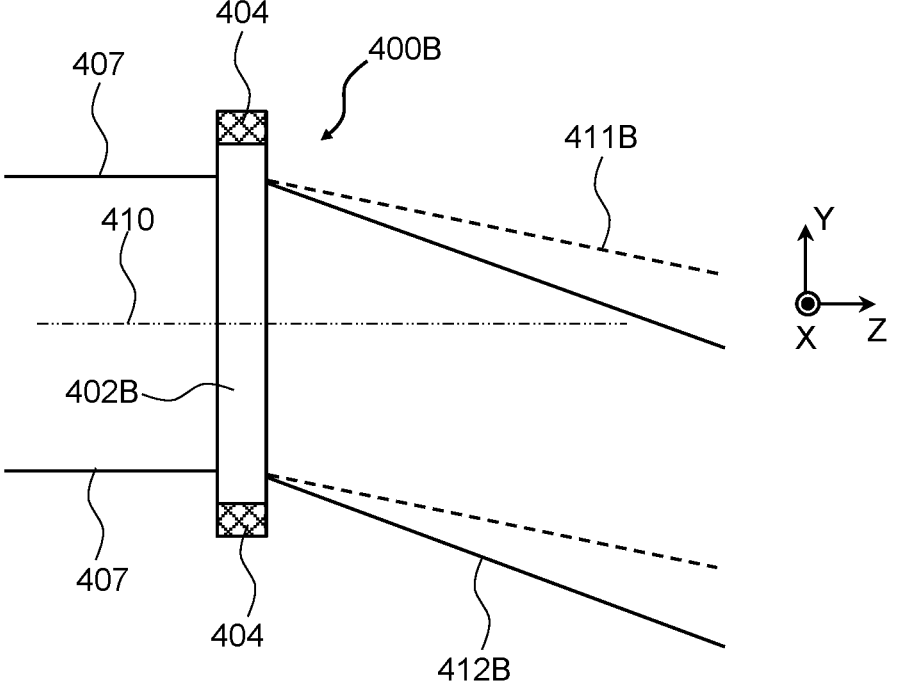
FIG. 4B is a schematic side view of a dynamic diffraction grating of this disclosure.

Turning to FIG. 4B, a diffractive optical element 400B is similar to the diffractive optical element 100 of FIG. 1, the diffractive optical element 200 of FIG. 2, and the diffractive optical element 300B of FIG. 3B, and includes similar components. The diffractive optical element 400B of FIG. 4B is configured to redirect the light beam 407 impinging onto the diffractive optical element 400B. The diffractive optical element 400B includes a slab 402B and a plurality of acoustic transducers 404 disposed and distributed adjacent a perimeter of a clear aperture of the diffractive optical element 400B, similarly to FIG. 3B. The diffractive optical element 400B may, but does not have to, have a rectangular shape.

When the acoustic transducers 404 are driven at a first frequency, a plane acoustic wave at a first pitch is created in the slab 402B. The plane acoustic wave creates a linear grating of refractive index variations in the slab 402B due to photoelasticity of the material of the slab 402B. The linear grating has the first pitch. The light beam 407 diffracts on the linear grating, propagating in a first direction (downwards in FIG. 4B), as illustrated by dashed lines 411B. When the acoustic transducers 404 are driven at a second frequency, a plane acoustic wave at a second pitch is created in the slab 402B. The plane acoustic wave creates a linear grating of refractive index variations in the slab 402B due to photoelasticity of the material of the slab 402B. The linear grating has the second pitch. The light beam 407 diffracts on the linear grating, propagating in a second direction, as illustrated by solid lines 412B.

Redirecting the light beam 407 is achieved by changing a period or pitch of the linear diffraction grating or pattern. Since the acoustic transducers are disposed on all four sides of the slab 402B, a two-dimensional diffraction grating may be created similar to the one illustrated in FIG. 3B, enabling the beam redirection in two orthogonal directions or planes, specifically in YZ plane (FIG. 4B), but also in XZ plane. Therefore, the diffractive optical element 400B functions as a dynamic 2D diffraction grating for variably redirecting and/or wavelength-dispersing the light beam 407. The period of the diffraction pattern may be changed by changing the time period of the acoustic wave modulation. In the embodiment of FIG. 4B, the light beams 411B, 412B deviate downward, but they could deviate in a different direction. In the embodiment of FIG. 4B, the light beam 407 impinges onto the slab 402B normally. In some embodiments, the light beam 407 may impinge onto the slab 402B non-normally. The light beam propagates through the slab 402B from the upstream surface to the downstream surface, substantially without zigzag reflections. In some embodiments, either one of the acoustic transducers 404 may be in an OFF state, and the other acoustic transducer may be in an ON state.

Figure 5A:
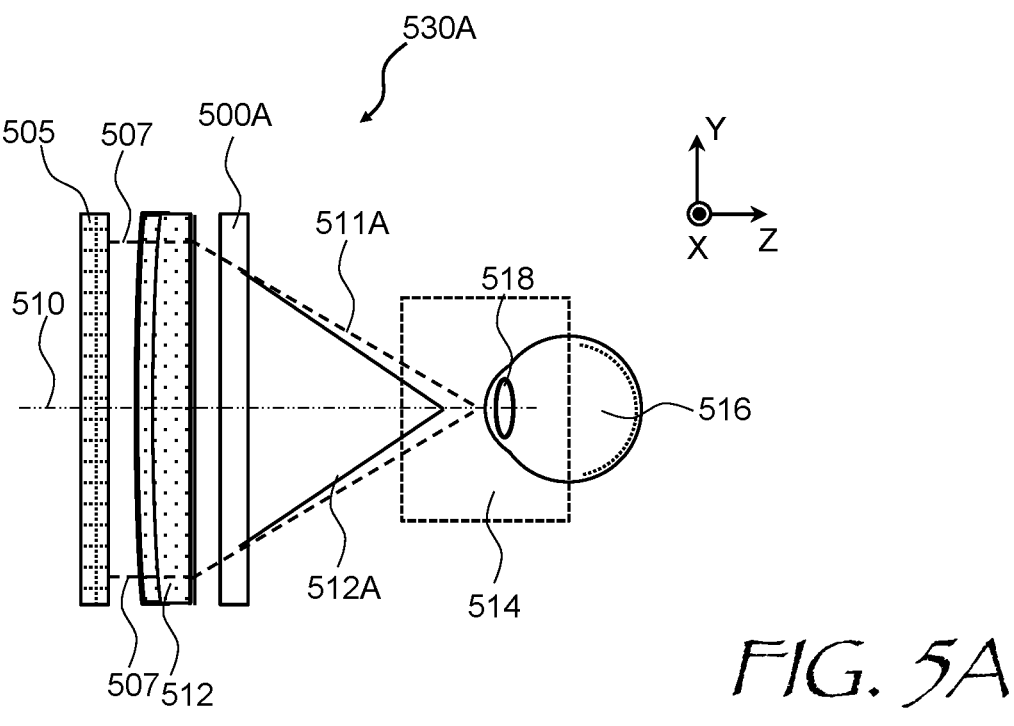
FIG. 5A is a schematic side view of a microdisplay-based near-eye display with the varifocal lens of FIG. 4A.

Referring to FIG. 5A, a near-eye display (NED) 530A includes a display panel 505, an ocular lens 509 disposed downstream of the display panel 505, and a diffractive optical element 500A disposed downstream of the display panel 505 and downstream of the ocular lens 509. The diffractive optical element 500A may include e.g. the diffractive optical element 100 of FIG. 1, the diffractive optical element 200 of FIG. 2, the diffractive optical element 300A of FIG. 3A, or the diffractive optical element 400A of FIG. 4A. In the current embodiment, the diffractive optical element 500A (FIG. 5A) is configured to refocus image light 507. The diffractive optical element 500A may be disposed upstream of the ocular lens 509.

The display panel 505 provides image light 507 carrying an image in a linear domain, i.e. an image where individual pixels are represented by ray coordinates of image light 507. The brightness and/or color of the pixels of the image in linear domain are represented by brightness and/or color of light rays at the corresponding ray coordinates. The image light 507 impinges onto the ocular lens 509. The ocular lens 509 is configured to convert the image light 507 from the linear domain into an angular domain, i.e. an image where individual image elements (pixels) are represented by a ray angle of a ray fan covering an entire FOV of the image. To that end, the ocular lens 509 collimates light emitted by each pixel of the display panel 505, and redirects the collimated light beam to an eyebox 514 at a beam angle corresponding to the pixel coordinate. The brightness and/or color of the pixels of the image in angular domain are represented by brightness and/or color of a light ray at a corresponding ray angle.

The image light 507 propagates through the diffractive optical element 500A. The purpose of the diffractive optical element 500A is to variably refocus the collimated beams from individual pixels. The collimated beams from individual pixels form the image light 507 that converges to a location of a pupil 518 of a user's eye 516 at the eyebox 514. When no acoustic waves are traveling within the diffractive optical element 500A, the image light 507 is focused/converged as indicated with dashed lines 511A. When acoustic waves are traveling within the diffractive optical element 500A, the image light 507 is additionally focused/converged closer to the diffractive optical element 500A. The image light 507 exiting the diffractive optical element 500A is shown in solid lines 512A in FIG. 5A.

Refocusing the image light 507/recollimation of the light beams emitted by individual pixels of the display panel 505 may be achieved by changing a period of a concentric diffraction pattern, i.e. concentric acoustic waves similar to the ones shown in FIG. 3A, and hence changing the focal length of the diffractive optical element 500A which acts as a varifocal diffractive lens. In turn, the spatial period (pitch) of the diffraction pattern is changed by changing the time period or frequency of the acoustic wave modulation. In the embodiment of FIG. 5A, the image light 507 represented by the lines 511A and 512A focus on the optic axis 510. The image light 507 then reaches the eyebox 514 and the pupil 518 of the user's eye 516. The variable refocusing of the image light 507 enables one to shift the focal plane of the image produced by the ocular lens 509 depending on the stereo imagery being displayed, thus alleviating vergence-accommodation conflict in the near-eye display 530A.

Figure 5B:
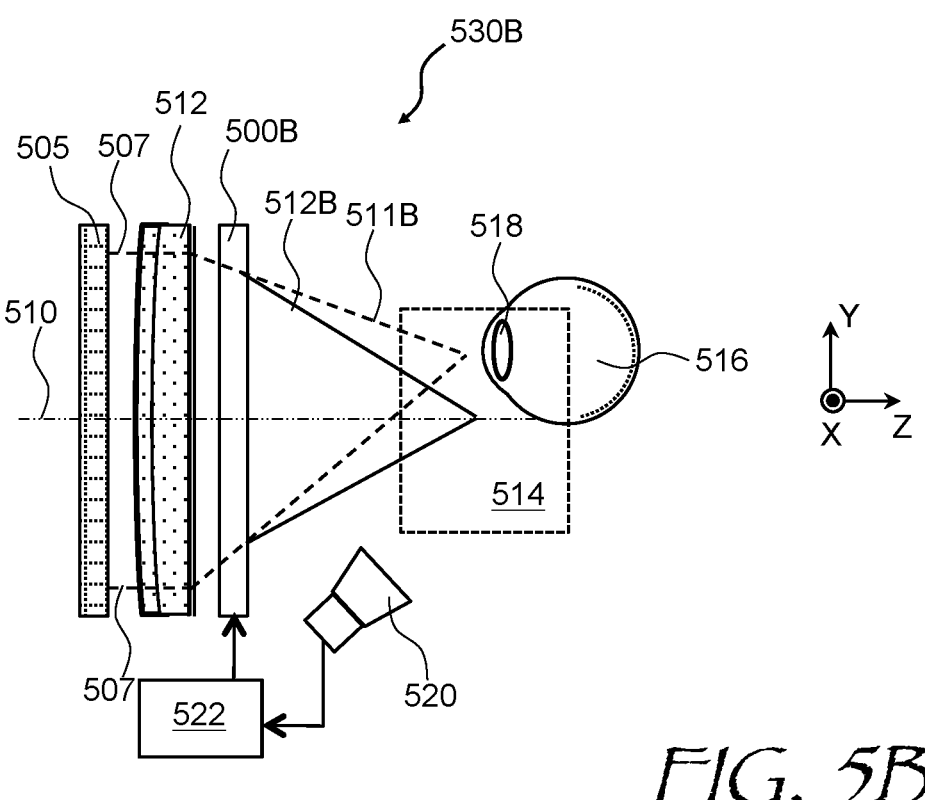
FIG. 5B is a schematic side view of a microdisplay-based near-eye display with the dynamic diffraction grating of FIG. 4B.

Turning to FIG. 5B, a near-eye display (NED) 530B is similar to the near-eye display 530A of FIG. 5A, and includes similar elements. The near-eye display 530B of FIG. 5B includes the display panel 505, the ocular lens 509 disposed downstream of the display panel 505, and a diffractive optical element 500B disposed downstream of the display panel 505. The diffractive optical element 500B may include e.g. the diffractive optical element 100A of FIG. 1A, the diffractive optical element 100B of FIG. 1B, the diffractive optical element 200 of FIG. 2, the diffractive optical element 300B of FIG. 3B, or the diffractive optical element 400B of FIG. 4B. In the embodiment illustrated in FIG. 5B, the diffractive optical element 500B is configured for redirecting the image light 507.

The beam redirection is performed in the following manner. The display panel 505 provides the image light 507 carrying an image in linear domain. The image light 507 propagates through the ocular lens 509. The ocular lens 509 converts the image in linear domain into an image in angular domain, similarly to the near-eye display 530A of FIG. 5A. The image light 507 (FIG. 5B) then propagates through the diffractive optical element 500B. When no acoustic waves are traveling within the diffractive optical element 500B, the image light 507 converges/focuses at the first location within the eyebox 514. The image light 507 exiting the diffractive optical element 500B is shown with dashed lines 511B. When acoustic waves are traveling within the diffractive optical element 500B, the image light 507 converges/focuses at a different location within the eyebox 514. The image light 507 exiting the diffractive optical element 500B is shown with solid lines 512B.

Redirection of the image light 507 may also be achieved by changing a spatial period or pitch of a linear diffraction pattern, i.e. an array of acoustic diffraction lines extending in one or two orthogonal directions as illustrated in FIG. 3B, hence making the diffractive optical element 500B act as a dynamic 2D diffraction grating for redirecting and/or dispersing a light beam 507. The pitch of the diffraction pattern is changed by changing the frequency of the acoustic wave modulation.

The focusing location may be controlled by a controller 522, which may receive information about the position of the user's eye 516 from an eye-tracking system 520. The controller 522 may be operably coupled to the eye tracking system 520 and the diffractive optical element 500B for causing the diffractive optical element 500B to at least one of redirect or refocus the image light, based on the at least one of a position or orientation of the user's eye 516 determined by the eye tracking system 520. The redirecting and refocusing functions may be combined by combining corresponding acoustic transducers' driving signals. The combined signals may be applied to the acoustic transducers of the diffractive optical element 500B.

Figure 6A:
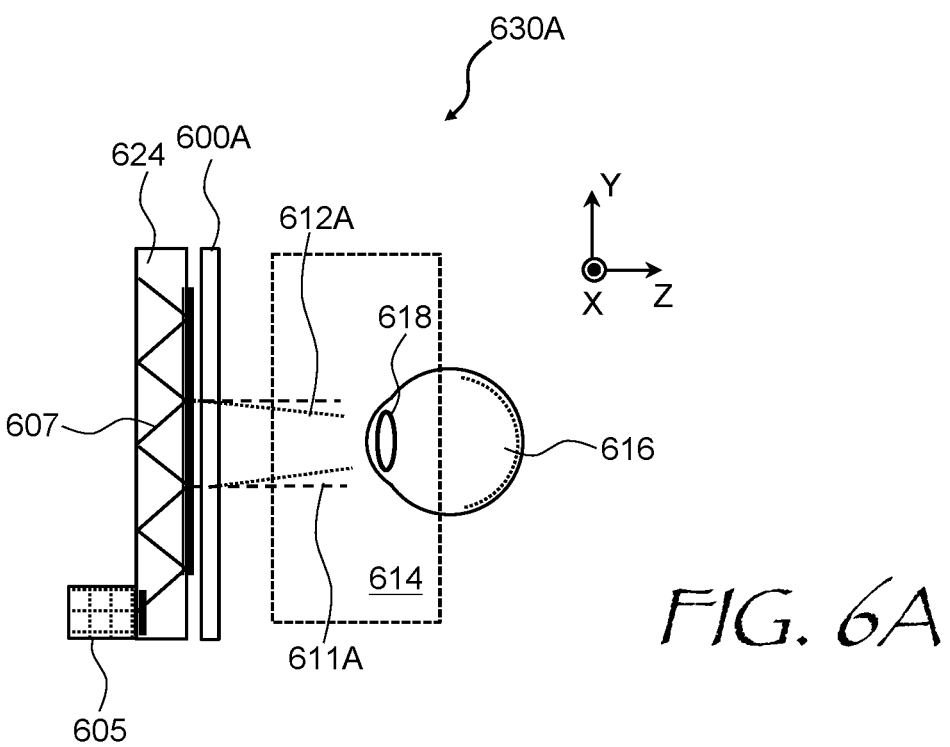
FIG. 6A is a schematic side view of a projector-based near-eye display with the varifocal lens of FIG. 4A.

Referring now to FIG. 6A, a near-eye display 630A includes an image projector 605, a pupil-replicating lightguide 624 coupled to the image projector 605, and a diffractive optical element 600A coupled to the pupil-replicating lightguide 624. The diffractive optical element 600A may include any of diffractive optical elements disclosed herein, e.g. the diffractive optical element 100 of FIG. 1, the diffractive optical element 200 of FIG. 2, the diffractive optical element 300A of FIG. 3A, or the diffractive optical element 400A of FIG. 4A. In the current embodiment, the diffractive optical element 600A is configured for refocusing a light beam 607.

In operation, the image projector 605 provides a light beam 607 carrying an image in an angular domain. The pupil-replicating lightguide 624 is optically coupled to the image projector 605. After leaving the image projector 605, the light beam 607 enters and propagates within the pupil-replicating lightguide 624. While propagating within the pupil-replicating lightguide 624 along a zigzag light path defined by a series of total internal reflections from outer parallel surfaces of the lightguide 624, the light beam 607 is expanded over an eyebox 614 of the near-eye display 630A. Upon exiting the pupil-replicating lightguide 624, the light beam 607 passes through the diffractive optical element 600A.

When no acoustic waves are traveling within the diffractive optical element 600A, the light beam 607 exits the diffractive optical element 600A along a path shown with dashed lines 611A. When acoustic waves are traveling within the diffractive optical element 600A, the light beam 607 is slightly focused by the diffractive optical element 600A, as illustrated by solid lines 612A. Refocusing the light beam 607 may also be achieved by changing a pitch of a concentric diffraction pattern (i.e. concentric acoustic waves similar to FIG. 3A) and hence changing the focal length of the diffractive optical element 600A, which acts as a varifocal diffractive lens. The pitch of the diffraction pattern is changed by changing the time period of the acoustic wave modulation, as explained above with reference to FIGS. 1, 2, 3A, and 4A. The light beam 607 then reaches the eyebox 614 and a pupil 618 of a user's eye 616. Refocusing the light beam 607 allows one to slightly refocus the displayed image to replace prescription glasses, alleviate the vergence-accommodation conflict, etc.

Figure 6B:
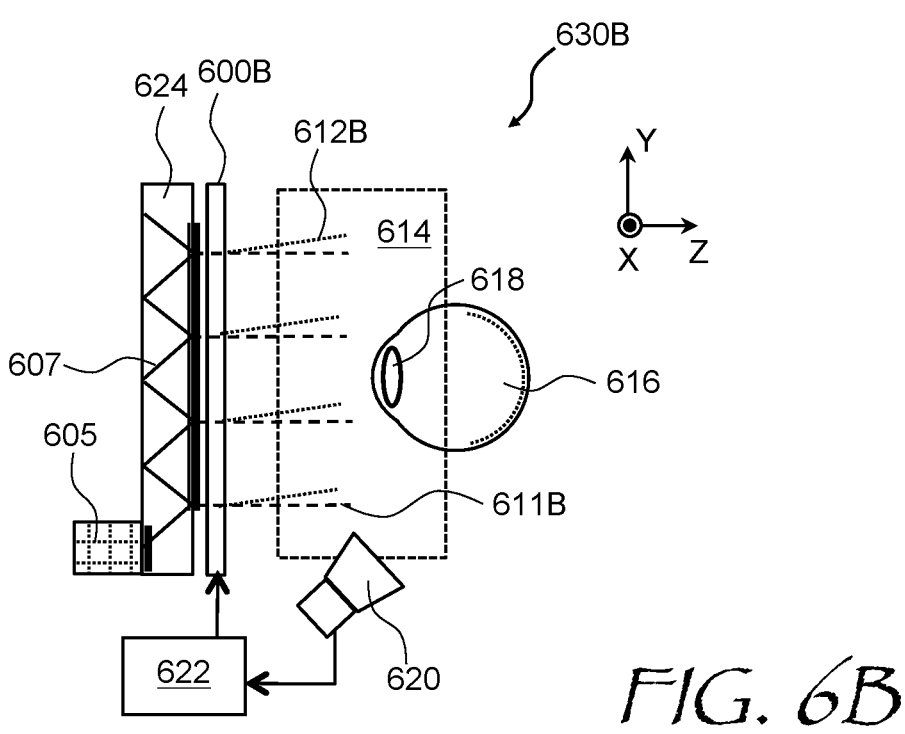
FIG. 6B is a schematic side view of a projector-based near-eye display with the dynamic diffraction grating of FIG. 4B.

Referring to FIG. 6B, a near-eye display 630B is similar to the near-eye display 630A of FIG. 6A, and includes similar elements. The near-eye display 630B of FIG. 6B includes the image projector 605, the pupil-replicating lightguide 624 coupled to the image projector 605, and a diffractive optical element 600B coupled to the pupil-replicating lightguide 624. The diffractive optical element 600B may include any of diffractive optical elements disclosed herein, e.g. the diffractive optical element 100 of FIG. 1, the diffractive optical element 200 of FIG. 2, the diffractive optical element 300B of FIG. 3B, or the diffractive optical element 400B of FIG. 4B. In the current embodiment, the diffractive optical element 600B is configured for redirecting the light beam 607.

In operation, the image projector 605 provides the light beam 607 carrying an image in an angular domain. The pupil-replicating lightguide 624 is optically coupled to the image projector 605. After leaving the image projector 605, the light beam 607 enters and propagates within the pupil-replicating lightguide 624. While propagating within the pupil-replicating lightguide 624 by a series of total internal reflections, the light beam 607 is expanded over the eyebox 614 of the near-eye display 630B. Upon exiting the pupil-replicating lightguide 624, the light beam 607 propagates through the diffractive optical element 600B.

When no acoustic waves are traveling within the diffractive optical element 600B, the light beam 607 propagates as indicated by dashed lines 611B. When acoustic waves are traveling within the diffractive optical element 600B, the light beam 607 propagates in a second direction (upwards) in FIG. 6B, as illustrated by dotted lines 612B. Redirecting the light beam 607 may also be achieved by changing the pitch of a linear diffraction pattern, i.e. an array of acoustic diffraction lines extending in one or two orthogonal directions as illustrated in FIG. 3B), hence making the diffractive optical element 600B act as a dynamic 2D diffraction grating for redirecting and/or dispersing a light beam 607. The light beam 607 then reaches the eyebox 614 and a pupil 618 of a user's eye 616. The beam angular shift is equivalent to shifting the field of view, or shifting the entire image in angular domain carried by the expanded light beam 607.

The image light 607 redirection and/or refocusing may be controlled by a controller 622 operably coupled to an eye-tracking system 520. The controller 522 may receive information about the position of the user's eye 516 from the eye tracking system 520, and may control the diffractive optical element 600B to cause the diffractive optical element 600B to at least one of redirect or refocus the expanded image light 607, based on the at least one of a position or orientation of the user's eye 616 determined by the eye tracking system 620. The redirecting and refocusing functions may be combined by combining corresponding acoustic transducers' driving signals. The combined signals may be applied to the acoustic transducers of the diffractive optical element 600B.

Figure 7:
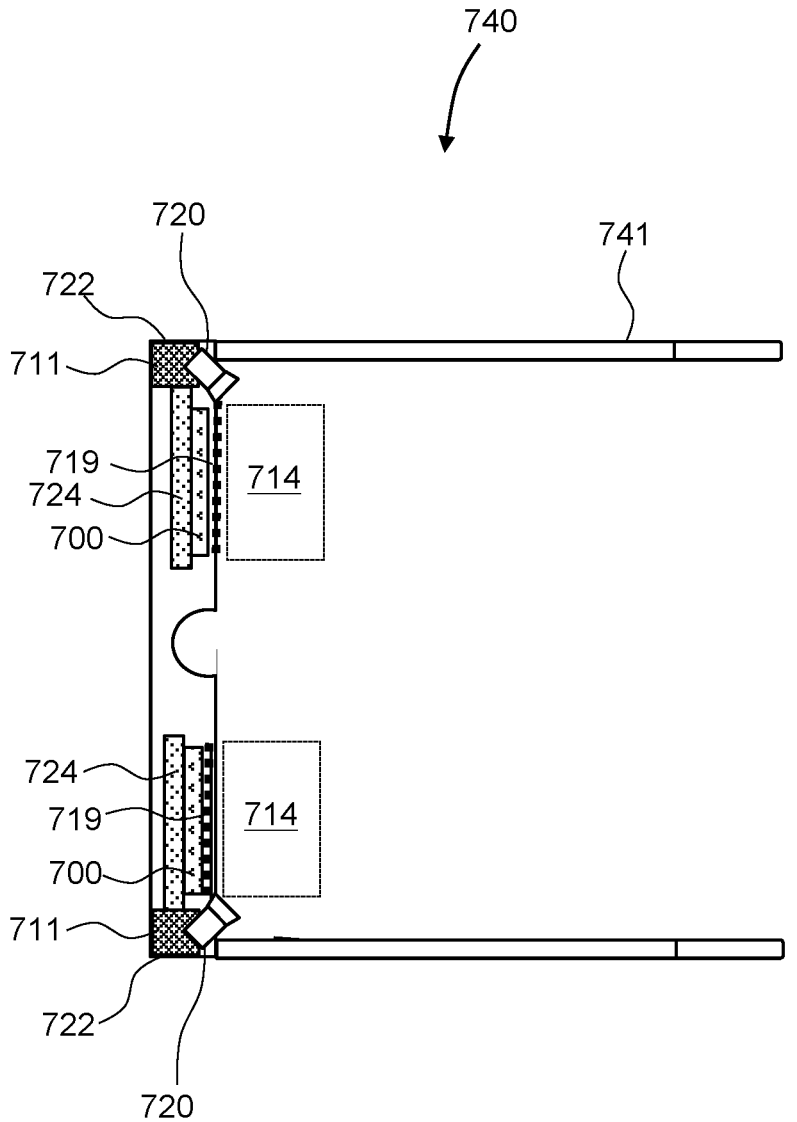
FIG. 7 is a view of an augmented reality (AR) display of this disclosure having a form factor of a pair of eyeglasses.

Referring to FIG. 7, an augmented reality (AR) near-eye display 740 includes a frame 741 having a form factor of a pair of eyeglasses. The frame 741 supports, for each eye: an image projector 711, a pupil-replicating lightguide 724 coupled to the projector 711 for expanding image light emitted by the projector 711 over an eyebox 714, a diffractive optical element 700 coupled to the pupil-replicating lightguide 724 for redirecting/focusing the image light expanded by the pupil-replicating lightguide 724, an eye-tracking camera 720, a plurality of illuminators 719, and an eye-tracking camera controller 722.

The diffractive optical element 700 may include any of the diffractive optical element disclosed herein, e.g. the diffractive optical elements 100, 200, 300A, 300B, 400A, or 400B of FIGS. 1, 2, 3A, 3B, 4A, and 4B respectively. The illuminators 719 may be supported by the diffractive optical element 700 for illuminating an eyebox 714. In operation, the projector 711 provides image light carrying an image in angular domain, which is conveyed to the eyebox 714 by the pupil-replicating lightguide 724.

The purpose of the eye-tracking cameras 720 is to determine position and/or orientation of both eyes of the user. Once the position and orientation of the user's eyes are known, a gaze convergence distance and direction may be determined. The imagery generated by the image projectors 711 may be adjusted dynamically to account for the user's gaze, for a better fidelity of immersion of the user into the displayed augmented reality scenery, and/or to provide specific functions of interaction with the augmented reality.

In operation, the illuminators 719 illuminate the eyes at the corresponding eyeboxes 714, to enable the eye-tracking cameras 720 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 714. The function of the eye-tracking camera controllers 722 is to process images obtained by the eye-tracking cameras 720 to determine, in real time, the eye gazing directions of both eyes of the user.

In some embodiments, the image processing and eye position/orientation determination functions may be performed by a central controller, not shown, of the AR near-eye display 740. The central controller may also provide control signals to the diffractive optical elements 700 to focus/shift/redirect images to be displayed to the user, depending on the determined eye positions, eye orientations, gaze directions, eyes vergence, etc.

Figure 8:
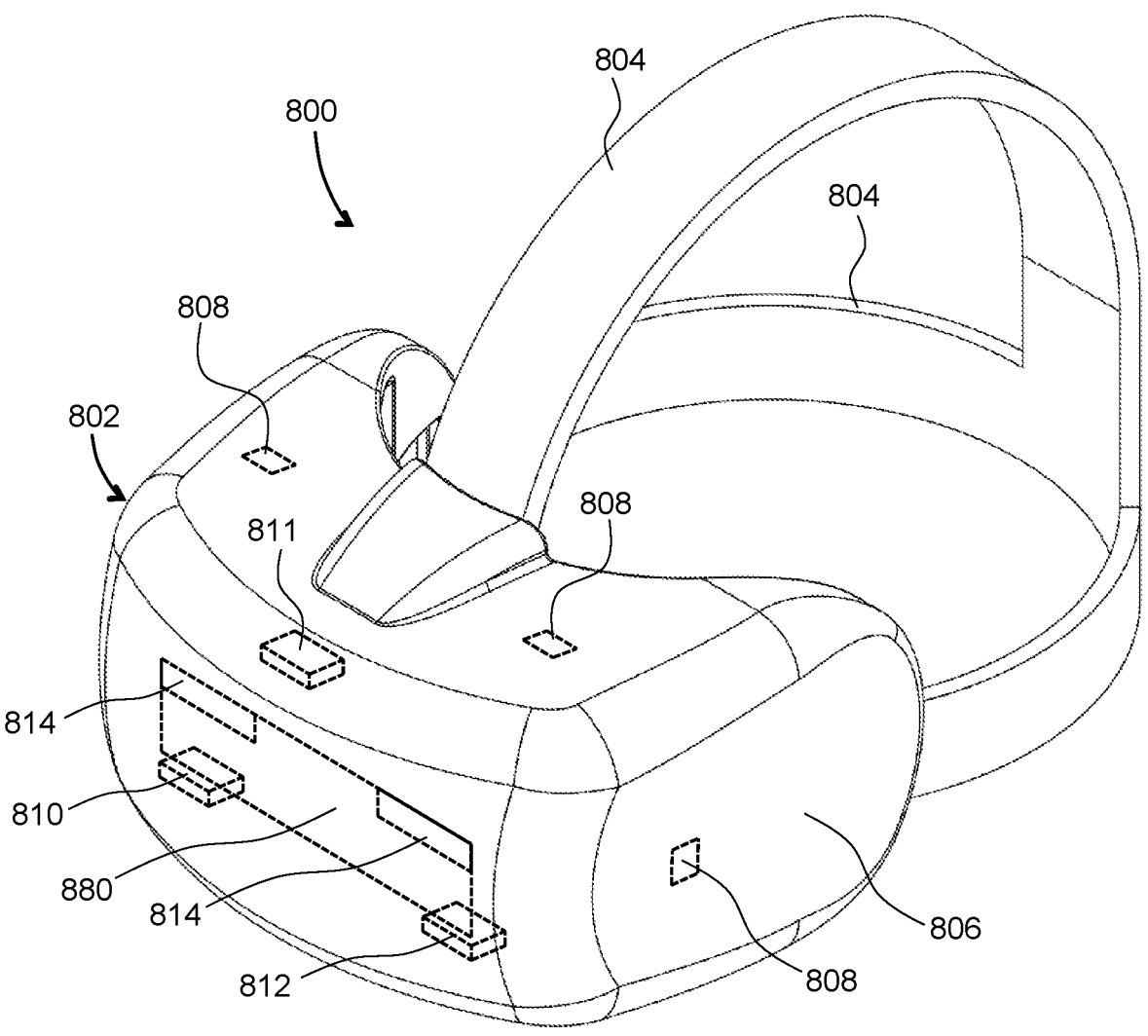
FIG. 8 is a three-dimensional view of a head-mounted display (HMD) of this disclosure.

Turning to FIG. 8, an HMD 800 is an example of an AR/VR wearable display system which encloses the user's face, for a greater degree of immersion into the AR/VR environment. The HMD 800 may generate the entirely virtual 3D imagery. The HMD 800 may include a front body 802 and a band 804 that can be secured around the user's head. The front body 802 is configured for placement in front of eyes of a user in a reliable and comfortable manner. A display system 880 may be disposed in the front body 802 for presenting AR/VR imagery to the user. The display system 880 may include any of the diffractive optical elements disclosed herein. Sides 806 of the front body 802 may be opaque or transparent.

In some embodiments, the front body 802 includes locators 808 and an inertial measurement unit (IMU) 810 for tracking acceleration of the HMD 800, and position sensors 812 for tracking position of the HMD 800. The IMU 810 is an electronic device that generates data indicating a position of the HMD 800 based on measurement signals received from one or more of position sensors 812, which generate one or more measurement signals in response to motion of the HMD 800. Examples of position sensors 812 include: one or more accelerometers, one or more gyroscopes, one or more magnetometers, another suitable type of sensor that detects motion, a type of sensor used for error correction of the IMU 810, or some combination thereof. The position sensors 812 may be located external to the IMU 810, internal to the IMU 810, or some combination thereof.

The locators 808 are traced by an external imaging device of a virtual reality system, such that the virtual reality system can track the location and orientation of the entire HMD 800. Information generated by the IMU 810 and the position sensors 812 may be compared with the position and orientation obtained by tracking the locators 808, for improved tracking accuracy of position and orientation of the HMD 800. Accurate position and orientation is important for presenting appropriate virtual scenery to the user as the latter moves and turns in 3D space.

The HMD 800 may further include a depth camera assembly (DCA) 811, which captures data describing depth information of a local area surrounding some or all of the HMD 800. The depth information may be compared with the information from the IMU 810, for better accuracy of determination of position and orientation of the HMD 800 in 3D space.

The HMD 800 may further include an eye tracking system 814 for determining orientation and position of user's eyes in real time. The obtained position and orientation of the eyes also allows the HMD 800 to determine the gaze direction of the user and to adjust the image generated by the display system 880 accordingly. The determined gaze direction and vergence angle may be used to adjust the display system 880 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 802.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer.

Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A diffractive optical element for at least one of redirecting or refocusing a light beam, the diffractive optical element comprising:

a slab of transparent material having opposed first and second surfaces for:

receiving the light beam at the first surface, propagating the light beam unidirectionally from the first surface to the second surface, and outputting the light beam at the second surface; and a set of acoustic transducers, wherein the set of traducers are:

positioned along a plurality of locations on an outer boundary of the slab, the outer boundary extending between the first and second surfaces of the slab, and configured to produce acoustic waves propagating towards a center of the slab.

2. The diffractive optical element of claim 1, wherein the set of acoustic transducers comprises a set of pairs of the acoustic transducers, wherein the acoustic transducers of each pair are facing each other.

3. The diffractive optical element of claim 2, wherein the acoustic transducers of each pair are configured to provide a standing acoustic wave.

4. The diffractive optical element of claim 1, wherein the perimeter is rectangular or circular.

5. The diffractive optical element of claim 1, wherein the set of acoustic transducers comprises interdigitated electrodes on at least one of the first or second slab surfaces.

6. The diffractive optical element of claim 1, wherein the slab comprises a piezoelectric material.

7. The diffractive optical element of claim 1 configured for operation as a diffraction grating with variable angular dispersion.

8. The diffractive optical element of claim 1 configured for operation as a varifocal diffractive lens.

9. A near-eye display (NED) comprising:

a display panel for providing an image in linear domain;

an ocular lens downstream of the display panel for converting the image in linear domain into an image in angular domain for observation by a user's eye, the image in angular domain being carried by image light; and a diffractive optical element downstream of the display panel for at least one of redirecting or refocusing the image light, the diffractive optical element comprising:

a slab of transparent material having opposed first and second surfaces for:

receiving the image light at the first surface, propagating the image light unidirectionally from the first surface to the second surface, and outputting the image light at the second surface; and a set of acoustic transducers, wherein the set of transducers are:

positioned along a plurality of locations on an outer boundary of the slab, the outer boundary extending between the first and second surfaces of the slab, and configured to produce acoustic waves propagating towards a center of the slab.

10. The NED of claim 9, wherein the set of acoustic transducers comprises a set of pairs of the acoustic transducers, wherein the acoustic transducers of each pair are facing each other.

11. The NED of claim 10, wherein the acoustic transducers of each pair are configured to provide a standing acoustic wave.

12. The NED of claim 9, wherein the diffractive optical element is configured for operation as a diffraction grating with variable angular dispersion.

13. The NED of claim 9, wherein the diffractive optical element is configured for operation as a varifocal diffractive lens.

14. The NED of claim 9, further comprising:

an eye tracking system for determining at least one of position or orientation of the user's eye at an eyebox of the NED; and a controller operably coupled to the eye tracking system and the diffractive optical element for causing the diffractive optical element to at least one of redirect or refocus the image light, based on the at least one of position or orientation of the user's eye determined by the eye tracking system.

15. A near-eye display (NED) comprising:

an image projector for providing a light beam carrying an image in angular domain;

a pupil-replicating lightguide optically coupled to the image projector and configured to expand the light beam over an eyebox of the NED;

a diffractive optical element coupled to the pupil-replicating lightguide for at least one of redirecting or refocusing the light beam expanded by the pupil-replicating lightguide, the diffractive optical element comprising:

a slab of transparent material having opposed first and second surfaces for:

receiving the light beam at the first surface, propagating the light beam unidirectionally from the first surface to the second surface, and outputting the light beam at the second surface; and a set of acoustic transducers, wherein the set of transducers are:

positioned along a plurality of locations on an outer boundary of the slab, the outer boundary extending between the first and second surfaces of the slab, and configured to produce acoustic waves propagating towards a center of the slab.

16. The NED of claim 15, wherein the set of acoustic transducers comprises a set of pairs of the acoustic transducers, wherein the acoustic transducers of each pair are facing each other.

17. The NED of claim 16, wherein the acoustic transducers of each pair are configured to provide a standing acoustic wave.

18. The NED of claim 15, wherein the diffractive optical element is configured for operation as a diffraction grating with variable angular dispersion.

19. The NED of claim 15, wherein the diffractive optical element is configured for operation as a varifocal diffractive lens.

20. The NED of claim 15, further comprising:

an eye-tracking system for determining at least one of position or orientation of a user's eye at the eyebox; and a controller operably coupled to the eye-tracking system and the diffractive optical element for causing the diffractive optical element to at least one of redirect or refocus the expanded light beam, based on the at least one of position or orientation of the user's eye determined by the eye tracking system.

* * * * *